(12) United States Patent
Iizuka

(10) Patent No.: US 6,473,233 B1
(45) Date of Patent: Oct. 29, 2002

(54) MULTI-BEAM OPTICAL SYSTEM

(75) Inventor: Takashi Iizuka, Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/590,287

(22) Filed: Jun. 9, 2000

(30) Foreign Application Priority Data

Jun. 11, 1999 (JP) .............................. 11-165644

(51) Int. Cl.[7] .......................... G02B 27/44; G02B 5/18; B41J 15/14
(52) U.S. Cl. ................... 359/566; 359/569; 359/742; 359/204; 347/244
(58) Field of Search ................... 359/204, 558, 359/565, 566, 573, 742; 347/233, 243, 244

(56) References Cited

U.S. PATENT DOCUMENTS

| | | | |
|---|---|---|---|
| 4,435,041 A | * | 3/1984 | Torok et al. ................. 359/573 |
| 5,798,784 A | | 8/1998 | Nonaka et al. ............. 347/243 |
| 6,021,000 A | | 2/2000 | Iizuka et al. ................ 359/574 |
| 6,097,547 A | * | 8/2000 | Ogata et al. ................ 359/558 |
| 6,178,028 B1 | * | 1/2001 | Washiyama et al. ........ 359/204 |

FOREIGN PATENT DOCUMENTS

JP        10-78504        3/1998

* cited by examiner

*Primary Examiner*—Audrey Chang
(74) *Attorney, Agent, or Firm*—Greenblum & Bernstein, P.L.C.

(57) ABSTRACT

A multi-beam optical systems forms a plurality of beam spots on an object surface to be exposed. The system includes a light source that emits a light beam having a plurality of peak wavelengths, a diffraction beam-dividing element that divides the light beam into a plurality of light beams exiting at the different diffraction angles, and a compensating optical system whose lateral magnification is inversely proportional to the wavelength of the light beam to compensate deviation of the diffraction angle of the diffracted light beams caused due to wavelength dependence of the diffraction beam-dividing element. The compensating optical system includes a diffractive lens component.

9 Claims, 1 Drawing Sheet

MULTI-BEAM OPTICAL SYSTEM

BACKGROUND OF THE INVENTION

The present invention relates to a multi-beam optical system such as to be employed in a multi-beam laser plotter for forming a plurality of beam spots on an object surface to be exposed, and more particularly to a multi-beam optical system wherein a diffractive beam-dividing element is used to divide a light beam emitted from a single light source into a plurality of separate light beams.

A multi-beam optical system of the above-mentioned type has conventionally employed a prism-type beam splitter as a beam-dividing element, which comprises a plurality of prism blocks cemented to one another. The cemented faces of the prism blocks are provided with multi-layer coatings having the desired reflecting properties, respectively.

With employing aphorism-type beam splitter, however, as each one of the multi-layer coatings could divide one incident beam only into two separate output beams, the number of the prism blocks corresponding to the required number of the separate beams must be cemented to one another, and when cementing one block to another block, a positional error between two blocks unavoidably arise if it is very small. Accordingly, when the large number of the separate beams are required, the deviations of the beam spots on the object surface tend to become large due to accumulation of positional errors between the cemented prism blocks.

Recently, a diffractive beam-dividing element has become used in place of a prism-type beam splitter. Since the diffractive beam-dividing element is made of a single block that is not cemented, it does not generate any positional error even when the large number of the separate beams are required.

With employing the diffractive beam-dividing element, however, since the diffraction angle of a light beam varies depending upon the wavelength thereof, the same order diffracted beam may form a plurality of beam spots indifferent positions on the surface to be exposed, in case a light source emits a light beam having a plurality of peak wavelengths.

For example, an argon laser, which is used as a light source of a laser photo plotter or the like, has a plurality of peak wavelengths in the ultraviolet and visible regions. Therefore, in order to avoid the above defects, it has been required to use a filter for passing a beam component of a selected peak wavelength. Thus, the beam components of peak wavelengths other than the selected peak wavelength are cut off by the filter, which results in low energy efficiency.

Further, even if a beam emitted from a light source has a single peak wavelength, in case a peak wavelength of a beam actually emitted from a light source fluctuates or varies, a beam spot pitch on a surface to be exposed is changed. The same can be said even in case a filter is used as explained hereinabove.

SUMMARY OF THE INVENTION

It Is therefore an object of the present invention to provide an improved multi-beam optical system capable of avoiding the defects caused by the wavelength dependency of a diffractive beam-dividing element employed therein.

For the above object, according to the present invention, there is provided an improved multi-beam optical system, which includes:

a light source that emits a light beam having a plurality of peak wavelengths;

a diffractive beam dividing element that divides the light beam emitted from the light source into a plurality of light beams exiting at the different diffraction angles, respectively; and a compensating optical system whose lateral magnification is inversely proportional to the wavelength of the light beam to compensate deviation of the diffraction angle of the diffracted light beams caused due to wavelength dependence of the diffractive beam-dividing element.

With this construction, the compensating optical system reduces the deviation of the diffraction angles of the light beams that have different peak wavelengths and are diffracted by the diffractive beam-dividing element, which allows the compensating optical system to align the same order diffraction beams diffracted by the different diffraction angles at the same position. Since the chromatic aberration caused by the diffractive beam-dividing element is too large to be corrected by a refractive lens system, the compensating optical system includes a diffractive lens component.

Further, the compensating optical system preferably includes:

a first group that has a positive power with a positive chromatic dispersion as a whole, the first group including a diffractive lens component having a negative power; and a second group that has a positive power with a negative chromatic dispersion as a whole, the second group including a diffractive lens component having a positive power.

In the specification, the positive chromatic dispersion is defined as such a wavelength dependence that an equivalent refractive index increases as wavelength decreases.

When the light beam incident on the diffractive beam-dividing element is a parallel beam, it is preferable to locate a converging element between the diffractive beam-dividing element and the compensating optical system to converge the parallel beams exiting from the diffractive beam-dividing element. Since the converging element is preferably free from the chromatic aberration, it may be a concave mirror or a refractive lens with a diffractive lens component that corrects the chromatic aberration.

Still further, each of the diffractive lens components of the first and second groups may be provided on a lens surface of the positive refractive lens or a mirror surface of a concave mirror. When the diffractive lens component is provided on the mirror surfaces, the diffractive lens component only generates the chromatic dispersion which has a linear relationship with the wavelength of the light beam, which is suitable to cancel the linear chromatic dispersion caused by the diffraction beam-dividing element.

Specifically, it is preferable that the first and second groups satisfy the following conditions (1) and (2).

$$\frac{\lambda_B}{\lambda_A} < \frac{f_1(\lambda_A) + f_2(\lambda_A)}{f_1(\lambda_B) + f_2(\lambda_B)} < \frac{\lambda_A}{\lambda_B} \quad (1)$$

$$\sqrt{\frac{\lambda_A}{\lambda_B}} < \frac{f_1(\lambda_A)}{f_2(\lambda_A)} \times \frac{f_2(\lambda_B)}{f_1(\lambda_B)} < \left(\sqrt{\frac{\lambda_A}{\lambda_B}}\right)^3 \quad (2)$$

where, $\lambda_A$, $\lambda_B$: peak wavelengths to be used among the plurality of peak wavelengths of the light source ($\lambda_A > \lambda_B$), $f_1(\lambda_A)$: the focal length of the first group at the wavelength $\lambda_A$, $f_1(\lambda_B)$: the focal length of the first group at the wavelength $\lambda_B$, $f_2(\lambda_A)$: the focal length of the second group at the wavelength $\lambda_A$, and $f_2(\lambda_B)$: the focal length of the second group at the wavelength $\lambda_B$.

When the multi-beam optical system is applied to a scanning optical system, the compensating optical system is preferably located between the diffractive beam-dividing element and a deflector. Further preferably, the compensating optical system may be located between the diffraction beam-dividing element and a multi-channel modulator that independently modulates each of the plurality of light beams exiting from the compensating optical system.

When the multi-beam optical system is used as a component of the scanning optical system, the compensating optical system functions as a relay lens that relays the diffractive beam-dividing element and the deflector such as a polygonal mirror. When the lateral magnification of the relay lens is inversely proportional to the wavelength of the light beam, the composite focal length of the optical system at the imaging side, i.e., in and after the diffractive beam-dividing element is inversely proportional to the wavelength, which compensates deviation of the diffraction angle of the diffracted light beams caused due to wavelength dependence of the diffraction beam-dividing element. Further, when the relay lens is an a focal lens, the angular magnification thereof is preferably proportional to the wavelength.

DESCRIPTION OF THE ACCOMPANYING DRAWINGS

DESCRIPTION OF THE EMBODIMENTS

Figure 1:
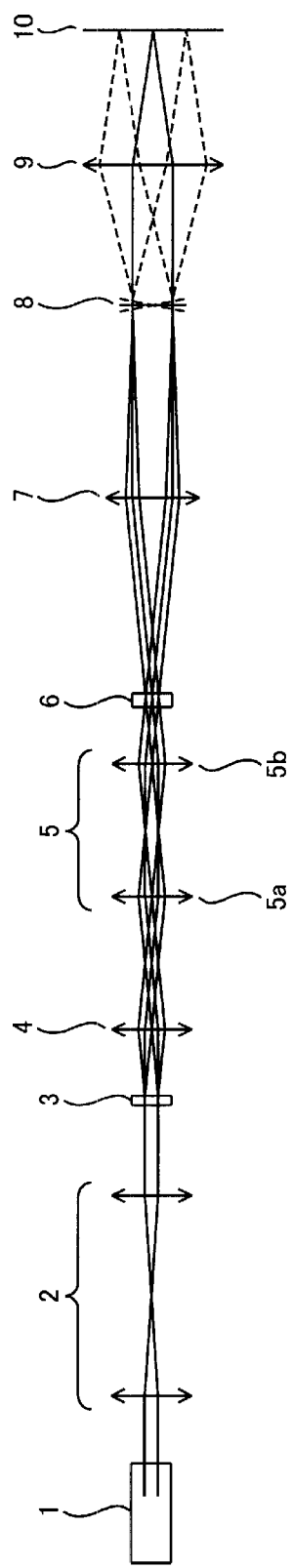
FIG. 1 shows a multi-beam scanning optical system embodying the invention.

A multi-beam optical system embodying the present invention will be described hereinafter by referring to the accompanying drawings. In the drawings, curved mirrors having optical powers which are disposed in the optical system are represented as if they are light transmittable elements like lenses.

As shown in FIG. 1, a multi-beam scanning optical system embodying the invention comprises a light source 1, a beam expander 2, a diffractive beam-dividing element 3, a converging mirror 4, a compensating optical system 5, a multi-channel modulator 6, a collimator lens 7, a polygonal mirror 8 as a deflector, an fθ lens 9 as a scanning lens and an object surface 10 to be exposed, which are arranged in this order from left in FIG. 1.

The light source 1 is a laser light source such as an argon laser having a plurality of peak wavelengths. The beam expander 2 enlarges the diameter of the light beam emitted from the light source 1. The diffractive beam-dividing element 3 diffracts the parallel beam from the beam expander 2 to divide it into a plurality of light beams outputting at different angles.

The parallel light beams divided by the diffractive beam-dividing element 3 are, respectively, converged by the converging mirror 4 and incident on the compensating optical system 5. The compensating optical system 5 comprises a first group 5a that includes a diffractive lens component having a negative power and a second group 5b that includes a diffractive lens component having a positive power. The first group 5a has a positive power with a positive chromatic dispersion as a whole, while the second group 5b has a positive power with a negative chromatic dispersion as a whole. The first and second groups 5a and 5b are arranged such that the focal length of the compensating optical system 5 is inversely proportional to the wavelength of the light beam incident thereon. Meanwhile, the compensating optical system 5 functions as an a focal relay optical system between the diffraction beam-dividing element 3 and the multi-channel modulator 6.

The multi-channel modulator 6 such as an acousto-optic modulator (AOM) independently modulates each of the plurality of light beams outputted from the compensating optical system 5. The modulated light beams are incident on the polygonal mirror 8, via the collimator lens 7, to be reflected and deflected as the polygonal mirror 8 rotates. The deflected light beams are converged by the fθ lens 9 to form a plurality of beam spots on the object surface 10.

Details of the compensating optical system 5 will be explained by referring tom FIG. 2. In this embodiment, the respective one of the first and second groups 5a and 5b comprises a concave mirror member, on the reflecting surface of which a diffractive lens structure like a Fresnel lens is formed. When the diffractive lens structure is formed on the reflecting surface of the respective mirror member, the chromatic dispersion in the compensating optical system 5 occurring only by the diffractive lens components thereof, so that the dispersion shows a linear relationship with the wavelength of the light beam, which is suitable to cancel the chromatic dispersion caused by the diffractive beam-dividing element 3 as it shows also a linear relationship with the wavelength of the light beam.

The dispersive power $v_{DOE}$ of the diffractive lens component, which corresponds to an Abbe number of a refractive lens, is −3.453. That is, the diffractive lens component shows a relatively large dispersive power as compared with a refractive lens, which allows the compensating optical system 5 to correct the chromatic aberration that is too large to be corrected by a refractive lens.

The compensating optical system 5 of this embodiment is constituted to compensate the deviations caused by the diffraction beam-dividing element 3 in the diffraction angles for the two peak wavelengths $\lambda_A$ and $\lambda_B$, which are used for image forming, among a plurality of peak wavelengths of the light beam emitted from the light source 1.

Hereinafter, the behavior of the −1st order diffraction light beam will be discussed by referring to FIG. 2. It should be noted that although FIG. 2 shows the light beam of −1st diffraction order for purpose of illustration and the discussion is done therefor, the same can be applied to any other order diffraction light beam. Further, for the discussions, the focal lengths of the elements in the illustrated optical system are defined as follows.

$f_0$: focal length of converging mirror 4, $f_1(\lambda_A)$: focal length of first group 5a at wavelength $\lambda_A$, $f_1(\lambda_B)$: focal length of first group 5a at wavelength $\lambda_B$, $f_2(\lambda_A)$: focal length of second group 5b at wavelength $\lambda_A$, and $f_2(\lambda_B)$: focal length of second group 5b at wavelength $\lambda_B$.

Please note that, as the first and second groups 5a and 5b of the compensating optical system 5 include the diffractive lens components, the variation of the focal lengths thereof in response to change in wavelength of the light beam becomes relatively large. Accordingly, the focal lengths of the first and second groups 5a and 5b are defined for the two peak wavelengths $\lambda_A$ and $\lambda_B$.

On the other hand, as the focal length of the converging mirror 4 does not vary in response to change in wavelength of the light beam, the focal length thereof is defined as a single value $f_0$. In the meantime, even if a converging element is constituted by a refractive lens in place of the converging mirror 4, the focal length variation thereof caused by change in wavelength of the light beam can be ignored, as the variation of the focal length of a refractive lens in response to the wavelength change is small as compared to the group which includes a diffractive element, and particularly as the wavelength difference between the peak wavelengths $\lambda_A$ and $\lambda_B$ in the light beam emitted from the common light source is small.

Figure 2:
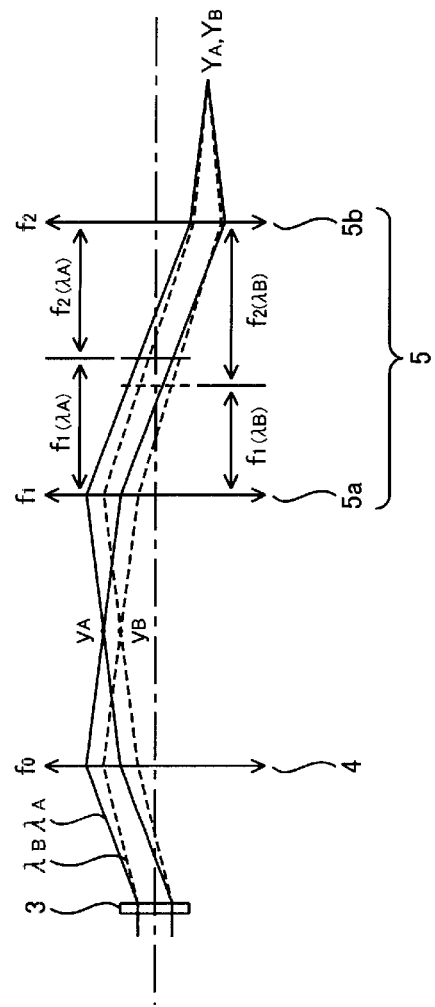
FIG. 2 is an enlarged view of a compensation optical system portion in the scanning optical system of FIG. 1.

In FIG. 2, the light beam of the wavelength $\lambda_A$ is indicated by the solid lines and the light beam of the wavelength $\lambda_B$ is indicated by the dashed line, as the diffraction angle of the −1st diffraction order beam exiting from the diffractive beam-dividing element 3 varies depending upon the wavelength.

The light beams incident upon the converging mirror 4 as parallel beams are converged by the converging mirror 4 and brought into focus at a distance $f_0$ from the converging mirror 4. In FIG. 2, $y_A$ denotes a height (distance) of the focus point of the light beam of the wavelength $\lambda_A$ from the optical axis while $y_B$ denotes the height (distance) of the focus point of the light beam of the wavelength $\lambda_B$. These heights $y_A$ and $y_B$ are expressed by:

$$y_A = f_0 \theta(\lambda_A/\lambda), \quad y_B = f_0 \theta(\lambda_B/\lambda)$$

where $\lambda$ is the standard wavelength of the diffractive beam-dividing element 3, and $\theta$ is the diffraction angle of the −1st order diffraction light beam at the standard wavelength $\lambda$.

Then, the lateral magnification $m_A$ at the wavelength $\lambda_A$ and the lateral magnification $m_B$ at the wavelength $\lambda_B$ of the compensating optical system 5 are expressed as follows.

$$m_A = f_2(\lambda_A)/f_1(\lambda_A), \quad m_B = f_2(\lambda_B)/f_1(\lambda_B)$$

Thus, the light beams exiting from the a focal compensating optical system 5 are converged at the certain positions, respectively, and the heights of the convergent points $Y_A$ and $Y_B$ from the optical axis are expressed as follows.

$$Y_A = y_A m_A, \quad Y_B = y_B m_B$$

In order to align the convergent points of the light beams at the wavelengths $\lambda_A$ and $\lambda_B$ at the same height, it becomes necessary to satisfy the following equation (a)

$$\frac{\lambda_A}{\lambda_B} = \frac{f_1(\lambda_A)}{f_2(\lambda_A)} \times \frac{f_2(\lambda_B)}{f_1(\lambda_B)} \tag{a}$$

Further, the following equation (b) must be satisfied for letting the compensating optical system 5 be a telecentric system whose exit pupil is at infinity.

$$f_1(\lambda_A) + f_2(\lambda_A) = f_1(\lambda_B) + f_2(\lambda_B) \tag{b}$$

When the equations (a) and (b) are satisfied, the compensating optical system 5 aligns the convergent points of the light beams of the wavelengths $\lambda_A$ and $\lambda_B$, which are diffracted by the diffraction beam-dividing element 3 by the different diffraction angles, at the same height from the optical axis, and the compensating optical system 5 directs the principal rays of these light beams in the same direction. As a result, the light beams travel along the same optical path thereafter, which allows treating the light beams of the different wavelengths as a single light beam in downstream of the multi-channel modulator 6.

It should be noted here that, in an actual device, it is not required to strictly satisfy the above equations (a) and (b), since a plurality of beam spots are arranged along the lines inclined with respect to the principal scanning direction and the auxiliary scanning direction, in an actual device, in order to make the interval of scanning lines on the object surface 10 smaller than that of the actual beam spots. Accordingly, there is a predetermined tolerance defined in the following conditions (1) and (2).

$$\frac{\lambda_B}{\lambda_A} < \frac{f_1(\lambda_A) + f_2(\lambda_A)}{f_1(\lambda_B) + f_2(\lambda_B)} < \frac{\lambda_A}{\lambda_B} \tag{1}$$

$$\sqrt{\frac{\lambda_A}{\lambda_B}} < \frac{f_1(\lambda_A)}{f_2(\lambda_A)} \times \frac{f_2(\lambda_B)}{f_1(\lambda_B)} < \left(\sqrt{\frac{\lambda_A}{\lambda_B}}\right)^3 \tag{2}$$

So far as the above conditions (1) and (2) are satisfied, the compensating optical system 5 functions effectively, that is, reduces the spot separation in the same diffraction order and the change in beam spot pitch.

Hereafter, a concrete example which satisfies the aforementioned equations (a) and (b) will be described. In this example, the standard wavelength of the diffraction beam-dividing element 3 is 355 nm, the peak wavelengths $\lambda_A$ and $\lambda_B$ are 360 nm and 350 nm, respectively. The focal length $f_0$ and the dispersive power $\nu_0$ of the converging mirror 4, $f_1$ and $\nu_1$ of the first group 5a, and $f_2$ and $\nu_2$ of the second group 5b at the wavelength 355 nm are shown in TABLE 1. The focal length $f_1$ of the first group 5a is a composite value of the focal length $f_{1M}$ of the concave mirror component and the focal length $f_{1D}$ of the diffractive lens component. In the same manner, the focal length $f_2$ of the second group is a composite value of $f_{2M}$ and $f_{2D}$. TABLE 1 also shows the focal lengths of the respective components.

TABLE 1

|  | Focal length | Dispersive power |
| --- | --- | --- |
| Converging mirror 4 | $f_0$ = 120 mm | $\nu_0 = \infty$ |
| First group 5a | $f_1$ = 120 mm | $\nu_1 = -2\nu_{DOE}$ |
|  | $f_{1M}$ = 80 mm |  |
|  | $f_{1D}$ = −240 mm |  |
| Second group 5b | $f_2$ = 120 mm | $\nu_2 = 2\nu_{DOE}$ |
|  | $f_{2M}$ = 240 mm |  |
|  | $f_{2D}$ = 240 mm |  |

Since the equations (a) and (b) are satisfied in the above example, the compensating optical system 5 completely corrects the deviations of the diffraction angles for the wavelengths 360 nm and 350 nm which are caused due to the wavelength dependence of the diffractive beam-dividing element 3.

According to the above described embodiment, the compensating optical system reduces the deviation of the diffraction angles of the light beams that have different peak wavelengths and are diffracted by the diffractive beam-dividing element, which allows the compensating optical system to align the same order diffraction beams diffracted by the different diffraction angles at the same position.

Therefore, the spot separation in the same diffraction order and the change in the beam spot pitch due to the wavelength dependence of the diffraction angle can be reduced while using the diffractive beam-dividing element that is free from the positional errors caused by cementing of a plurality of blocks in the prism-type beam splitter.

The present disclosure relates to the subject matter contained in Japanese Patent Application No. HEI 11-165644, filed on Jun. 11, 1999, which is expressly incorporated herein by reference in its entirety.

What is claimed is:

1. A multi-beam optical system, comprising:
   a light source;
   a diffractive beam-dividing element that divides the light beam emitted from said light source into a plurality of light beams exiting therefrom at different diffraction angles, respectively;
   a converging element that is located at the exit side of said diffraction beam-dividing element to converge the beams exiting from said diffractive beam-dividing element; and
   a compensating optical system whose lateral magnification is inversely proportional to the wavelength of the light beam to compensate deviation in the diffraction angle of the diffracted light beams caused due to wavelength dependence of said diffraction beam-dividing element, said compensating optical system including at least one diffractive lens component,
   wherein the focus points of the beams formed by said converging element are located between said converging element and said compensating optical system.

2. The multi-beam optical system according to claim 1, wherein:
   said at least one diffractive lens component includes a first diffractive lens component having a negative power and a second diffractive lens component having a positive power; and
   said compensating optical system comprises:
      a first group that has a positive power with a positive chromatic dispersion as a whole, said first group including said first diffractive lens component; and
      a second group that has a positive power with a negative chromatic dispersion as a whole, said second group including said second diffractive lens component.

3. The multi-beam optical system according to claim 2, wherein said diffractive lens components of said first and second groups are provided on reflection surfaces having positive powers.

4. The multi-beam optical system according to claim 2, wherein said first and second groups satisfy the following conditions (1) and (2);

$$\frac{\lambda_B}{\lambda_A} < \frac{f_1(\lambda_A) + f_2(\lambda_A)}{f_1(\lambda_B) + f_2(\lambda_B)} < \frac{\lambda_A}{\lambda_B} \quad (1)$$

$$\sqrt{\frac{\lambda_A}{\lambda_B}} < \frac{f_1(\lambda_A)}{f_2(\lambda_A)} \times \frac{f_2(\lambda_B)}{f_1(\lambda_B)} < \left(\sqrt{\frac{\lambda_A}{\lambda_B}}\right)^3 \quad (2)$$

where,
   $\lambda_A$, $\lambda_B$: peak wavelengths to be used among the plurality of peak wavelengths of said light source ($\lambda_A > \lambda_B$),
   $f_1(\lambda_A)$: the focal length of said first group at the wavelength $\lambda_A$,
   $f_1(\lambda_B)$: the focal length of said first group at the wavelength $\lambda_B$,
   $f_2(\lambda_A)$: the focal length of said second group at the wavelength $\lambda_A$, and
   $f_2(\lambda_B)$: the focal length of said second group at the wavelength $\lambda_B$.

5. The multi-beam optical system according to claim 1, wherein the light beam incident on said diffractive beam-dividing element is a parallel beam, and converging element converges the parallel beams exiting from said diffractive beam-dividing element.

6. The multi-beam optical system according to claim 1, further comprising:
   a multi-channel modulator that independently modulates each of the plurality of light beams exiting from said compensating optical system;
   a deflector that deflects the light beams modulated by said multi-channel modulator; and
   a scanning lens that converges the deflected light beams to form a plurality of beam spots on an object surface to be exposed,
      wherein said compensating optical system is located between said diffraction beam-dividing element and said deflector.

7. The multi-beam optical system according to claim 6, wherein said compensating optical system is located between said diffraction beam-dividing element and said multi-channel modulator.

8. A multi-beam optical system, comprising:
   a light source;
   a diffractive beam-dividing element that divides the light beam emitted from said light source into a plurality of light beams exiting therefrom at different diffraction angles, respectively; and
   a compensating optical system to compensate deviation in the diffraction angle of the diffracted light beams caused due to wavelength dependence of said diffraction beam-dividing element,
   wherein said compensating optical system comprises:
      a first group that has a positive power with a positive chromatic dispersion as a whole, said first group including a diffractive lens component having a negative power; and
      a second group that has a positive power with a negative chromatic dispersion as a whole, said second group including a diffractive lens component having a positive power.

9. The multi-beam optical system according to claim 8, wherein the lateral magnification of said compensating optical system is inversely proportional to the wavelength of the light beam.

* * * * *